(12) United States Patent
Hayashi

(10) Patent No.: US 7,052,386 B2
(45) Date of Patent: May 30, 2006

(54) CURVED SURFACE CUTTING PROCESSING METHOD

(75) Inventor: Kenichi Hayashi, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 316 days.

(21) Appl. No.: 10/395,826

(22) Filed: Mar. 24, 2003

(65) Prior Publication Data

US 2003/0232578 A1   Dec. 18, 2003

(30) Foreign Application Priority Data

Mar. 25, 2002 (JP) .............................. 2002-083916

(51) Int. Cl.
*B24B 47/02* (2006.01)
(52) U.S. Cl. .................. 451/398; 451/28; 451/31; 451/42; 451/384; 451/390; 451/540
(58) Field of Classification Search .................. 451/28, 451/31, 42, 384, 390, 398, 540
See application file for complete search history.

(56) References Cited

U.S. PATENT DOCUMENTS 3,635,265 A * 1/1972 Cortez ......................... 142/38

5,740,707 A * 4/1998 Svochak et al. ............. 82/1.11
5,861,114 A * 1/1999 Roffman et al. ............. 264/2.5
6,315,650 B1 * 11/2001 Council et al. ............. 451/384
6,825,979 B1 * 11/2004 Ogawa ........................ 359/565

* cited by examiner

Primary Examiner—Joseph J. Hail, III
Assistant Examiner—Shantese McDonald
(74) Attorney, Agent, or Firm—Hogan & Hartson, LLP

(57) ABSTRACT

A curved surface cutting method in which a surface of a material is cut by a bite to form a specified curved surface, a cutting edge of the bite is provided with a flat section and corner sections at both ends of the flat section; the posture of the cutting edge of the bite is adjusted such that a ridge line along the flat section of the cutting edge of the bite is in parallel with a tangent drawn at the curved surface; and the surface of the material is cut with the cutting edge of the bite retained in the posture while feeding the cutting edge in a predetermined feeding direction, thereby forming a first band-like cut surface having a width corresponding to the width of the cutting edge of the bite. Each time the band-like cut surface is completed, the cutting edge of the bite is separated from the surface of the material, the cutting edge of the bite is moved in a direction perpendicular to the predetermined feeding direction by a distance shorter than the width of the cutting edge of the bite, and another band-like cut surface is formed at a position adjacent to the first band-like cut surface.

14 Claims, 4 Drawing Sheets

CURVED SURFACE CUTTING PROCESSING METHOD

BACKGROUND OF THE INVENTION

1. Field of the Invention

The present invention relates to a method for cutting curved surfaces which is applicable when a cutting process is employed to form curved surfaces of lenses and metal mold surfaces for forming lens surfaces of lens forming metal molds. Also, the present invention relates to lenses and lens forming metal molds formed by cutting processing.

2. Related Background Art

Lens surfaces of objective lens that may be used for optical pickup apparatuses or the like, or metal molds for forming such lens surfaces are typically formed by copying machining by a copying lathe. A bite that is used in the lathe machining has an arcuate cutting edge, and the cutting edge of the bite is moved along a curve that copies a desired lens configuration. Also, when a lens surface is to be provided with a blazed configuration, the lens surface and stepped configuration of the blaze are cut by a bite having an arcuate cutting edge with a cutting edge angle being pointed as sharp as possible.

When lens surfaces of a lens are cut by using a bite that is equipped with an arcuate cutting edge, a cutting edge region of the cutting edge that abuts against the surface of the lens material is moved along the lens configuration during the cutting processing. For this reason, when such cutting work is performed by a lathe, corrections of configuration are necessary based on the cutting edge radii of the bite and the lens configuration.

Also, since the cutting region of the arcuate cutting edge moves according to the lens configuration, it is difficult of create correction data by directly feeding back measurement results by a configuration measurement apparatus that is generally used.

Furthermore, since the arcuate cutting edge is pressed against the surface of the lens material in a point-contact state to cut the surface, cutting regions of the arcuate cutting edge that are used for cutting would likely become one-sided depending on the lens configuration, in other words, the use frequency of cutting portions in the arcuate cutting edge may become non-uniform. When the use frequency of cutting portions in the arcuate cutting edge is not uniform, portions that are more frequently used worn out more quickly, and the wears become non-uniform, and the service life of the bite shortens.

Furthermore, blazed sections are cut in the lens surface by a bite having an arcuate cutting edge with a corner section that is formed by partially reducing the radius of curvature of the arc of the arcuate cutting edge as small as possible. However, when the lens surface is cut, a cutting edge section adjacent to the corner section in the arcuate cutting edge is mainly used. For this reason, the corner section and portions of the arcuate cutting edge adjacent to the corner section are worn more quickly. When wears at the corner section and portions of the arcuate cutting edge adjacent to the corner section increase, die wears are formed at corners of the formed blazed steps, and the steps cannot be accurately cut.

SUMMARY OF THE INVENTION

The present invention provides a method for machining curved surfaces that can prevent non-uniform wears of a cutting edge of a bite, thereby preventing the bite from shortening its service life, and that facilitates the positioning control of the bite during cutting work.

In accordance with an embodiment of the present invention, in a curved surface cutting method in which a surface of a material is cut by a bite to form a specified curved surface, a cutting edge of the bite is provided with a flat section and corner sections at both ends of the flat section; the posture of the cutting edge of the bite is adjusted such that a ridge line along the flat section of the cutting edge of the bite is in parallel with a tangent drawn at the curved surface; the surface of the material is cut with the cutting edge of the bite retained in the posture described above while feeding the cutting edge in a predetermined feeding direction, thereby forming a first band-like cut surface having a width corresponding to the width of the cutting edge of the bite; and when each time the band-like cut surface is completed, the cutting edge of the bite is separated from the surface of the material, the cutting edge of the bite is moved in a direction perpendicular to the predetermined feeding direction by a distance shorter than the width of the cutting edge of the bite, and another band-like cut surface is formed at a position adjacent to the first band-like cut surface.

In the curved surface cutting method in accordance with the present embodiment, the entire portion along the straight cutting edge of the bite is used to cut the material. Accordingly, in contrast to the case of an arcuate cutting edge configuration in which cuttings take place in a point-contact manner, wears of the cutting edge are reduced, and non-uniform abrasions do not occur, such that the service life of the bite can be extended.

Also, the entire portion along the cutting edge of the bite is used as a cutting region regardless of curved surface configurations of objects to be processed, and the ridge line along the cutting edge is maintained to be in parallel with a tangent drawn at the curve of the curved surface, the position control of the cutting edge of the bite is simpler. For example, for controlling the position of the cutting edge of the bite, a center position of the ridge line of the cutting edge may be used as a positional coordinate of the cutting edge of the bite, deviations in the shape of the cut surface formed can be directly fed as positional coordinates for controlling the position of the cutting edge of the bite (i.e., as correction amounts in cutting).

Further, a cut surface is formed with one cutting process, and a new cut surface is formed in a succeeding cutting process at a position adjacent to the cut surface in a manner that the cut surfaces are partially overlapped one another. Accordingly, even when the end sections of the bite cutting edge are worn, uncut portions do not occur, and an increase in cutting errors by abrasions can be prevented.

When curved surfaces of a rotation symmetry, a lathe cutting may be used. By cutting surfaces of the material with the bite, a plurality of ring band-shaped cut surfaces may be formed concentrically on the surface of the material.

When the adjacent new band-shaped cut surface is formed, the bite may preferably be moved by a distance in a range between 10% and 50% of the width of the cutting edge of the bite. By conducting the cutting process in an overlapping state with this level of overlapping amount, uncut portions and increase in the cutting errors due to abrasions of the bite cutting edge can be securely prevented.

Further, in the cutting method in accordance with the present embodiment, microscopically speaking, a finished surface formed by the flat cut surfaces is obtained in a state approximate to a curved surface. However, when the radius of curvature of the curved surface of the object is R, and an allowable error for the designed measurement of the curved surface is a, the curved surface configuration can be cut with an error that is within the allowable error when the width of the cutting edge of the bite is $2\sqrt{(2aR-a2)}$ or less. It goes without saying that the narrower the width, the higher the precision with which the curved surface can be cut.

Next, in the curved surface cutting method in accordance with the present embodiment, the surface of the material may be cut by using the corner section of the cutting edge of the bite, whereby stepped sections ca be formed in the surface.

In this case, the corner section of the cutting edge section may preferably be angled at 90 degree, and could be in a range from about 90 degree to about 120 degree in view of practical aspects such as the easiness in manufacturing bites and the like.

In the curved surface cutting method in accordance with the present embodiment, curved surfaces and stepped sections are cut by using a cutting edge section of a bite having a flat cutting edge with angled sections on both sides of the flat cutting edge. Abrasion of the bite cutting edge can be reduced, compared to the case in which stepped sections are cut by using a corner section provided in an arcuate bite cutting edge. Also, both of the corner sections can be used to cut stepped sections that face in both opposing directions.

Also, the radius of curvature of the corner section at the flat shape cutting edge section of the bite is very small, which proves a very sharp configuration. As a result, a very steep stepped configuration can be obtained compared to the case where a corner section provided in an arcuate bite cutting edge is used to cut a stepped configuration.

Here, the width of the cutting edge section of the bite may preferably be 10 μm or greater. The cutting edge section having such a size is practical because it can be readily manufactured, favorable in terms of the service life and strength, and does not pose any problems in cutting work.

Also, when the width of the cutting edge section is narrower, finer cutting work becomes possible. However, in view of problems that may encounter in the manufacturing of bites and problems in terms of the strength, the width of the cutting edge section in a rage between about 5 μm and about 10 μm may be practical. Within this range of the width of the cutting edge section, there would be no problem in terms of the service life although their strength may slightly lower.

The curved surface cutting method in accordance with the present embodiment is suitable for cutting lens surfaces of objective lenses that may be used in optical pickup devices or the like.

In this case, when a lens surface, which may be a curved convex surface or a curved concave surface of a lens, is to be provided concentric stepped sections, the corner sections of the cutting edge section of the bite can be used to cut the surface of the material to form the stepped sections in the lens surface.

Similarly, the curved surface cutting method in accordance with the present embodiment is suitable for cutting metal mold surfaces of a lens forming metal mold for forming lens surfaces. In this case also, the corner sections of the cutting edge section of the bite can be used to cut the surface of the mold material such that stepped sections corresponding to the stepped sections in the lens surface can be formed.

Also, lenses that are manufactured by using lens forming metal molds that are manufactured by the curved surface cutting method in accordance with the present embodiment have stepped sections that are formed highly accurately.

Other features and advantages of the invention will be apparent from the following detailed description, taken in conjunction with the accompanying drawings that illustrate, by way of example, various features of embodiments of the invention.

PREFERRED EMBODIMENTS OF THE INVENTION

Figure 1:
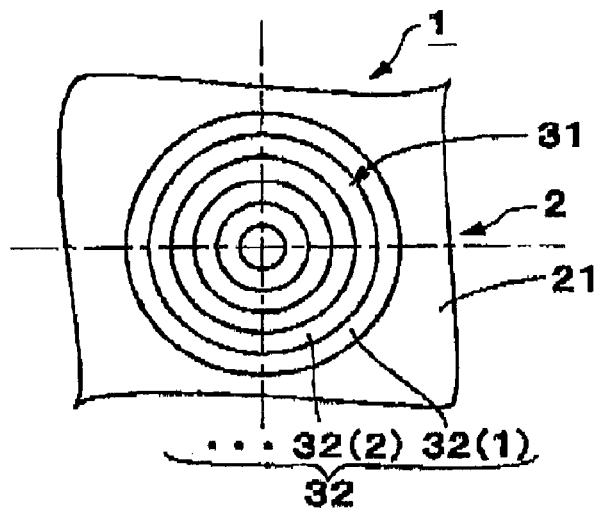
FIG. 1(a) shows a plan view in part of a lens surface forming surface of a lens forming metal mold that is cut by a cutting method in accordance with an embodiment of the present invention.
FIG. 1(b) shows a cross-sectional view in part of FIG. 1(a)
FIG. 1(c) shows a partially enlarged cross-sectional view of a part of the lens forming surface in FIG. 1(b)
FIG. 1(d) shows a cross-sectional view of a lens that is manufactured by the lens forming metal mold shown in FIGS. 1(a)–1(c).
Figure 1:
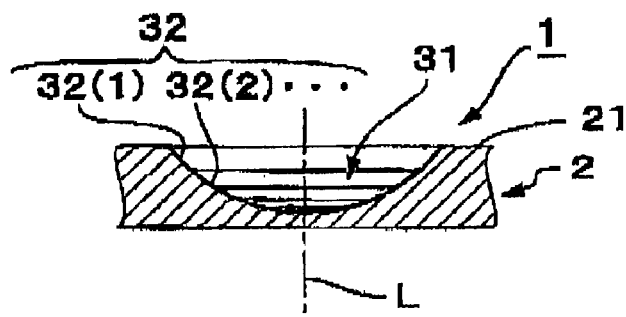
Figure 1:
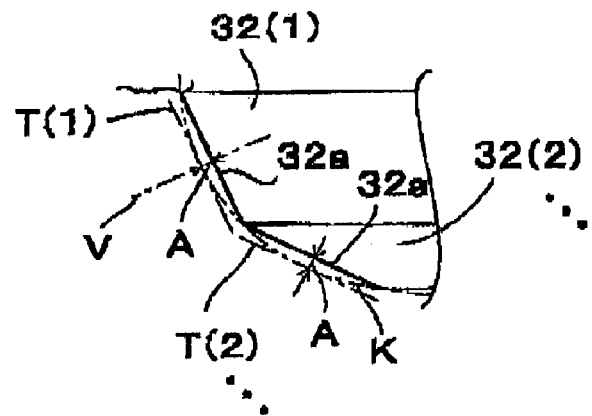
Figure 1:
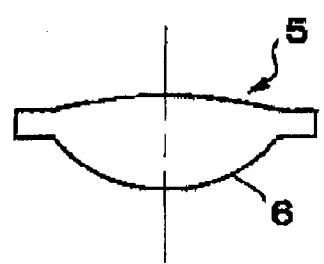

An example of cutting process for cutting metal mold forming surfaces of a lens metal mold for forming lens surfaces in accordance with an embodiment of the present invention is described with reference to the accompanying drawings.

(Lens Forming Metal Mold)

First, a lens forming metal mold 1 that is obtained by the exemplary cutting process of the present embodiment is described with reference to FIGS. 1(a)–1(d). FIG. 1(a) shows a plan view in part of a lens surface forming surface of the lens forming metal mold, FIG. 1(b) shows a cross-sectional view in part of the lens surface forming surface, FIG. 1(c) shows a partially enlarged cross-sectional view of a part of the lens forming surface, and FIG. 1(d) shows a cross-sectional view of a lens that is manufactured by the lens forming metal mold.

The lens forming metal mold 1 is used to form a lens 5, such as an objective lens, a collimate lens, a sensor lens or the like, that may compose an optical system of an optical pickup, for example. The lens forming metal mold 1 is equipped with a mold main body 2, and a cavity that is defined by a lens surface forming surface 31 formed in a center of a top surface 21 of the mold main body 2. One of convex curved lens surfaces 6 of the lens 5 is formed by the lens surface forming surface 31.

The lens surface forming surface 31 is substantially composed of an arcuate concave curved surface, but is defined in its microscopic view by ring band-shaped cut surfaces 32, (32(1), 32(2), . . . ), each having a predetermined width, that are formed concentrically with respect to a center axis line L that is a center of a rotation symmetry of the arcuate concave curved surface. The ring band-shaped cut surfaces 32 present flat surfaces as viewed in a cross section taken along a width direction thereof Accordingly, as shown in FIG. 1(c), the arcuate concave curved surface, if cut in a plane including the center axis line L, is formed by a polygon composed of numerous straight lines 32a having the same length that approximate a curve K indicated by an imaginary line that defines the target lens curved surface.

Here, the maximum error A of the straight lines 32a in the ring band-shaped cut surfaces 32 with respect to the curve K is set to be within a maximum allowable error range against the designed measurement of the lens curve. For example, in the case of an optical pickup device that uses a laser beam with a wavelength of 650 nm, the allowable error a is generally set to be 20 nm or blow. By narrowing the width of each of the ring band-shaped cut surfaces 32 as described below, the maximum error of the straight line 32a with respect to the curve K can be suppressed within values of the allowable error range, such that the lens surface forming surface 31 that has no practical problems can be formed by the plurality of ring band-shaped cut surfaces 32.

(Method for Cutting Lens Surface Forming Surface)

Figure 2:
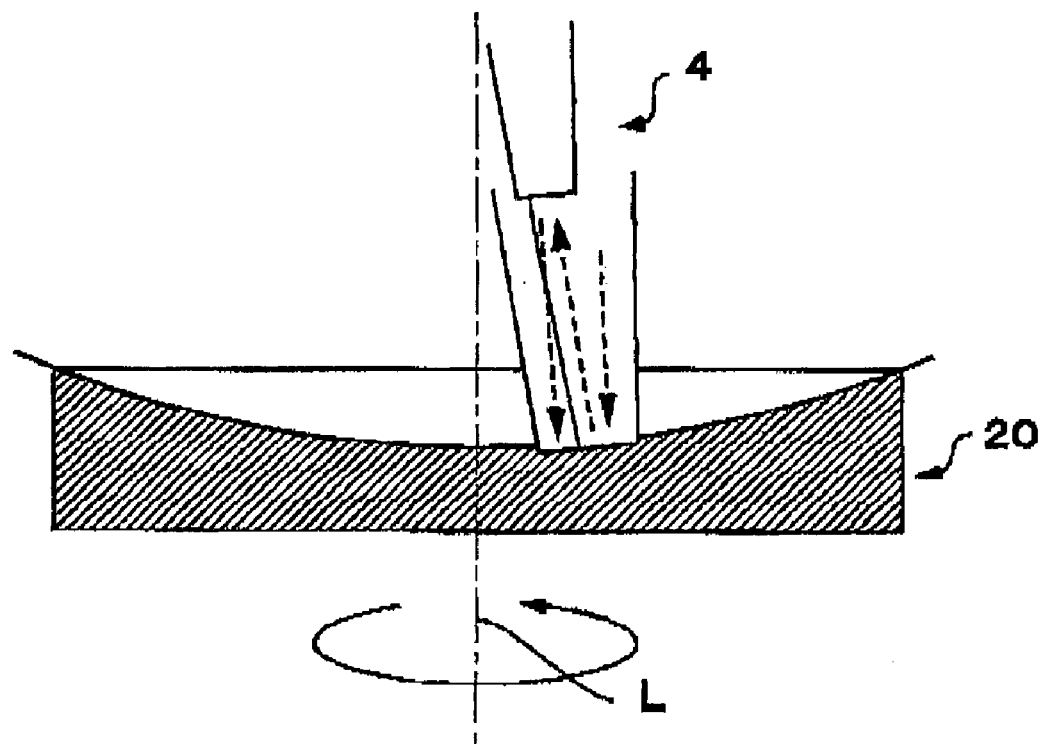
FIG. 2(a) shows an explanatory view of a cutting edge configuration of a bite that is used in cutting the lens forming metal mold shown in FIGS. 1(a)–1(c)
FIG. 2(b) shows an explanatory view of a cutting operation that uses the bite.
Figure 2:
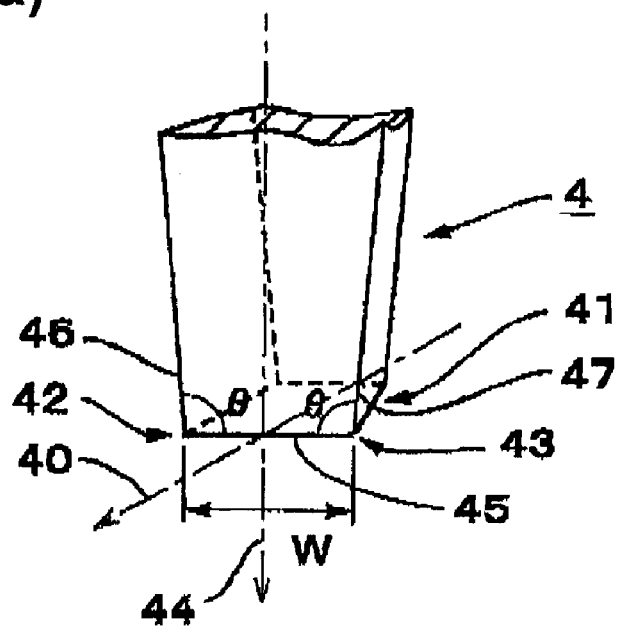

Referring to FIGS. 1 and 2, a description is made as to a method for cutting the lens surface forming surface 31 in the lens metal mold 1 having the structure described above. FIG. 2(a) shows an explanatory view of a cutting edge configuration of a bite 4 that is used in cutting the lens forming metal mold, and FIG. 2(b) shows an explanatory view of a cutting operation that uses the bite.

First, as shown in FIG. 2(a), the bite 4 that is used in the present example has a cutting edge 41 in a rectangular configuration having a straight edge and corner sections 42 and 43 at both ends of the straight edge as viewed in a bite feeding direction 40. More specifically, the cutting edge 41 is equipped with a main cutting blade 45 having a predetermined width that linearly extends in a direction perpendicular to a bite cutting direction 44, and auxiliary cutting blades 46 and 47 each extending at an angle θ on either of the right and left sides of the main cutting blade 45. The angle θ at each of the corner sections 42 and 43 in the present embodiment is set within a range between 90 degree to 120 degree.

Next, the cutting work is performed by a lathe. A metal mold material 20 to be machined and the bite 4 are mounted on a lathe not shown in the drawings. The metal mold material 20, which is chucked on the rotation shaft of the lathe, is rotated around its center axis line L, and cutting and feeding operations by the bite 4 are performed to cut surfaces of the metal mold material 20.

Here, referring to FIG. 1(c), a normal line V is drawn on the designed curve K that defines the lens surface forming surface 31 to pass a cutting edge ridge line of the bite 4, i.e., the center of the main cutting blade 45. A tangential line T(1) is drawn at a position on the curve K where the normal line V and the curve K intersect. In the present example, the posture of the cutting edge 41 of the bite 4 is determined such that the cutting edge ridge line becomes parallel with the tangential line T(1). While this posture is maintained, the surface of the metal mold material 20 is cut by the cutting edge of the bite 4 in a direction of the normal line V of the curve K. As the metal mold material 20 is rotating with its center axis line L being the center of rotation, in other words, the cutting edge 41 of the bite is fed in the circumferential direction, one ring band-shaped cut surface 32(1) having a width that is the same as the width W of the cutting edge of the bite is formed in one cutting operation. In the illustrate example, the cutting operation is started with the outermost circumferential portion of the lens surface forming surface 31.

After the one ring band-shaped cut surface 32(1) is formed, the cutting edge 41 of the bite 4 is once separated from the surface of the metal mold material 20, as indicated by an arrow in FIG. 2(b), then the cutting edge 41 of the bite 4 is moved from the initial cut surface 32(1) in a direction perpendicular to the feeding direction 40 of the bite 4 (e.g., inward in the radial direction in the present example) by a distance shorter than the width W of the cutting edge 41 of the bite. The moving amount may preferably be in a range between about 10% and 50% of the width W of the bite cutting edge. Then, the bite cutting edge 41 is pressed against the surface of the metal mold material 20, in other words, is fed to cut the surface of the metal mold material 20 to form a second ring band-shaped cut surface 32(2) adjacent to the first ring band-shaped cut surface 32(1).

By repeating the cutting operations described above, the many concentrical ring band-shaped cut surfaces 32 each having a predetermined width are formed as shown in FIG. 1(a), which form the lens surface forming surface 31 as a whole in the form of a convex curved surface.

Figure 3:
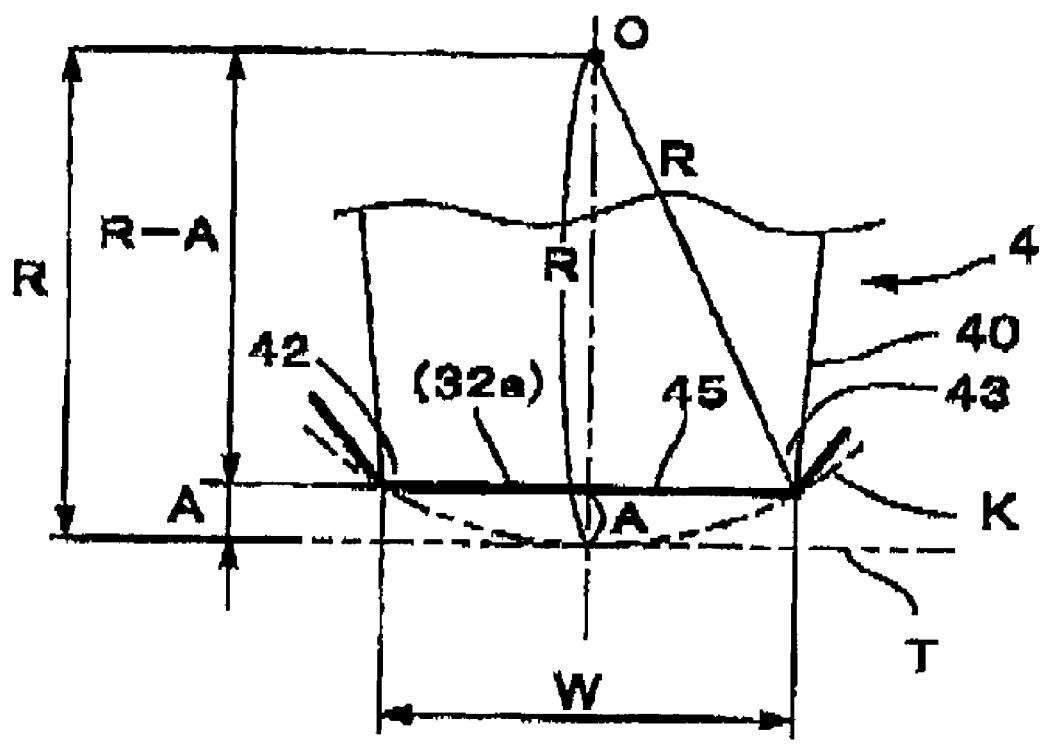
FIG. 3 shows an explanatory view illustrating a method to determine the width of the cutting edge of the bite.

Next, as shown in FIG. 3, in accordance with the cutting method of the present embodiment, the lens surface forming surface 31 has a cut surface whose cross section is formed by a polygon composed of the straight lines 32a having the same length connected together that approximate the lens designed curve K. Accordingly, errors that occur when the straight line 32a is advanced in cutting in a manner to intersect the curve K become maximum when both of the ends of the straight line 32a contact the curve K, or the straight line 32a contacts the curve K.

In other words, in a state in which the cutting edge 41 has been advanced in cutting from a poison where the cutting edge 41 touches a tangential line T drawn on the lens design curve K having a radius of curvature R to a position where the ends 42 and 43 of the cutting edge 41 touch the curvature K, or to a position where the cutting edge 41 concurs with the tangential line T, the maximum error A occurs. Accordingly, the maximum error A is set to be within the design allowable error a. For this, the width W of the cutting edge 41 may preferably be set according to the following formula:

$$W < 2\sqrt{(2aR - a2)}$$

For example, in the case of a lens used in an optical pickup device, when the radius of curvature R of the lens surface is 2 mm, and the allowable error a is 20 nm, the width W of the cutting edge 41 is preferably be less than 17 μm. When the radius of curvature R of the lens surface is 2 mm, and the allowable error a is 10 nm, the width W of the cutting edge 41 is preferably be less than 12 μm. It is noted that the width of the cutting edge may preferably be greater than 10 μm. The cutting edge having such a size is practical because it can be readily manufactured, favorable in terms of the service life and strength, and does not pose any problems in cutting work. Also, when the width of the cutting edge section is narrower, finer cutting work becomes possible. However, in view of problems that may encounter in the manufacturing of bites and problems in terms of the strength, the width of the cutting edge section in a rage between about 5 μm and about 10 μm may be practical. Within this range of the width of the cutting edge section, there would be no problem in terms of the service life although their strength may slightly lower.

By deciding the width of the cutting edge in this manner, when the width W of the cutting edge of the bite is 5 μm, lenses having a radius of curvature in the order to millimeter that are generally currently used as lenses for optical pickup devices can be cut to form required lens surfaces by the cutting method in accordance with the present invention.

(Cutting Method for Blaze Configuration and Stepped Configuration)

Next, due to the fact that the cutting edge 41 of the bite 4 of the present embodiment is provided with the corner sections 42 and 43 at both ends of the cutting edge 41, lens forming metal molds for forming blazed lenses can also be cut.

Figure 4:
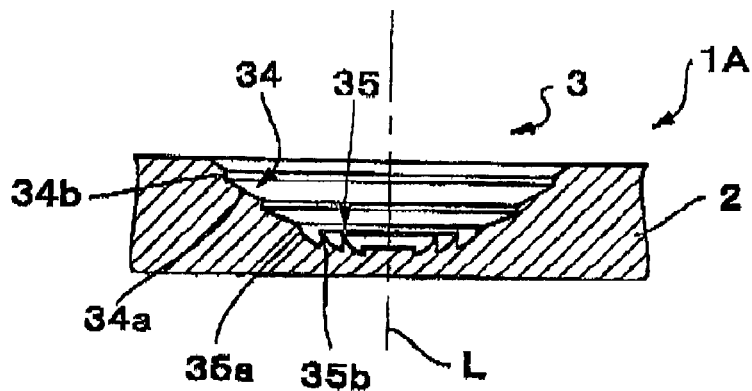
FIG. 4(a) shows a cross-sectional view in part of a lens surface forming surface of a lens forming metal mold that is cut by a cutting method in accordance with an embodiment of the present invention.
FIG. 4(b) shows an explanatory view illustrating a state in which stepped sections are cut in the lens forming metal mold.
FIG. 4(c) shows an explanatory view illustrating a state in which other stepped sections are cut in the lens forming metal mold.
FIG. 4(d) shows a cross-sectional view of a lens that is manufactured by the lens forming metal mold shown in FIGS. 4(a)–4(c).
Figure 4:
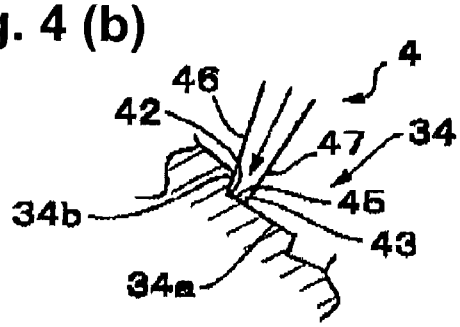
Figure 4:
Figure 4:
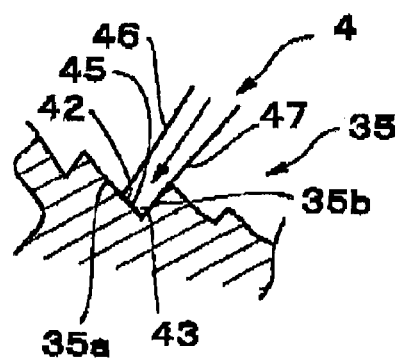

FIG. 4(a) shows a cross-sectional view in part of a lens forming metal mold 1A having a lens surface forming surface equipped with a blazed configuration and stepped configuration. FIG. 4(b) shows an explanatory view illustrating a state in which stepped sections are cut in the lens forming metal mold. FIG. 4(c) shows an explanatory view illustrating a state in which other stepped sections are cut in the lens forming metal mold. FIG. 4(d) shows a cross-sectional view of a lens that is manufactured by the lens forming metal mold shown in FIGS. 4(a)–4(c).

As shown in these figures, the lens forming metal mold 1A includes a mold main body 2 and a concave section for forming lens surfaces 3. A stepped section 34 and a blazed section 35 are formed on the inner circumferential surface of the concave section for forming lens surfaces 3 arranged in this order from its outer circumferential side to the inner circumferential side. The stepped section 34 has a flat surface section 34a and end sections on both sides of the flat surface section 34a. One of the end sections, which is an end section 34b located on the outer side with respect to the center axis line L that defines a rotation axis of the lens material (i.e. a work piece) in the process to cut the metal main body 2, rises. The blazed section 35 has a flat surface section 35a and end sections on both sides of the flat surface section 35a. One of the end sections, which is an end section 35b located on the inner side with respect to the center axis line L, rises.

When forming the stepped section 34 and the blazed section 35, the flat surface sections 34a and 35a are cut with the main cutting blade 45 of the bite 4, and the end sections 34b and 35a are cut with the corner sections 42 and 43. The bite 4 has the auxiliary cutting blades 46 and 47 each rising at an angle of about 90 degrees to 120 degrees with respect to the main cutting blade 45. For this reason, upon pressing the bite 4 against the work piece, the rising configurations of the end sections 34b and 35b in the stepped section 34 and the blazed section 35, respectively, can be formed by the auxiliary cutting blades 46 and 47.

Also, one of the corner sections of the bite 4 may be used to form the end section 34b that rises on the outer side of the stepped section 34 with respect to the center axis line L, and the other of the corner sections of the bite 4 may be used to form the end section 35b of the blazed section 35 that rises on the side of the center axis line L. Accordingly, even when the stepped section 34 and the blazed section 34 rise on the sides inverted with respect to the above, the cutting work can be performed without having to exchange the bite 4.

OTHER EMBODIMENTS

In the examples described above, the curved surface cutting method of the present invention is applied to a cutting process to form lens surface forming surfaces of each of the lens forming metal molds 1 and 1A that may be used for optical pickup devices. However, the present invention is similarly applicable to cases where lens surfaces are directly subject to a cutting process. Also, the present invention is also applicable to cutting curved surfaces of optical elements other than lenses. Furthermore, the present invention is similarly applicable to cutting curved surfaces of materials other than those of optical elements.

As described above, in the curved surface cutting method in accordance with the present invention, a cutting edge of a bite is provided with a flat section and corner sections at both ends of the flat section which generally define a part of a rectangle as viewed in the bite feeding direction; the posture of the cutting edge of the bite is adjusted such that a ridge line along the flat section of the cutting edge of the bite is in parallel with a tangential line drawn at a curved surface to be formed; and the cutting edge of the bite is pressed against the lens material and the cutting edge is fed in a predetermined feeding direction while the cutting edge of the bite retained in the posture described above, thereby forming a band-like cut surface having a specified width. Then, another new cut surface is formed in a position adjacent to the previously cut surface in a manner to overlap the previous cut surface. By repeating these operations, cut surfaces each having a predetermined width, which approximate a curved surface can be formed.

Accordingly, by the method in accordance with the present invention, since the entire portion of a straight cutting edge of a bite can be utilized in cutting work, the cutting edge of the bite can be effectively utilized, and non-uniform abrasions do not occur in the cutting edge unlike an arcuate cutting edge, and therefore the service life of the bite can be extended. Furthermore, unlike an arcuate cutting edge, cutting positions in a cutting edge of the present invention do not change. Accordingly, the control in positioning the cutting edge of the bite is facilitated, and the control in correcting configuration errors is also facilitated.

Furthermore, due to the fact that adjacent cut surfaces are formed in a manner to be overlap one another, occurrence of uncut portions and increase in configuration errors due to abrasion of cutting edges of a bite can be prevented or suppressed.

While the description above refers to a particular embodiment of the present invention, it will be understood that many modifications may be made without departing from the spirit thereof The accompanying claims are intended to cover such modifications as would fall within the true scope and spirit of the present invention.

The presently disclosed embodiment is therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A curved surface cutting method in which a surface of a material is cut by a bite to form a specified curved surface, the curved surface cutting method comprising:

providing a cutting edge of the bite with a flat section and corner sections at both ends of the flat section;

determining a posture of the cutting edge of the bite such that a ridge line along the flat section of the cutting edge of the bite is in parallel with a tangential line drawn at the curved surface;

cutting the surface of the material with the cutting edge of the bite retained in the posture while feeding the cutting edge in a predetermined feeding direction, thereby forming a first band-like cut surface having a width corresponding to the width of the cutting edge of the bite; and when each time the band-like cut surface is completed, separating the cutting edge of the bite from the surface of the material, moving the cutting edge of the bite in a direction perpendicular to the predetermined feeding direction by a distance shorter than the width of the cutting edge of the bite, and forming another band-like cut surface at a position adjacent to the first band-like cut surface.

2. A curved surface cutting method according to claim 1, wherein the surface of the material is lathed by the bite to form a plurality of concentric ring band-like cut surfaces on the surface of the material.

3. A curved surface cutting method according to claim 1, wherein the bite is moved by a distance in a range of about 10% to about 50% of the width of the cutting edge of the bite when forming the other band-like cut surface adjacent to the first band-like cut surface.

4. A curved surface cutting method according to claim 1, wherein, when the curved surface has a radius of curvature R, and an allowable error $\alpha$ with respect to a design measurement, the width of the cutting edge of the bite is set at $2\sqrt{(2aR-a^2)}$ or less.

5. A curved surface cutting method according to claim 1, wherein the surface of the material is cut by the corner sections of the cutting edge of the bite to form a stepped section in the surface.

6. A curved surface cutting method according to claim 1, wherein each of the corner sections of the cutting edge of the bite is angled at about 90 degree to about 120 degree with respect to the flat section of the cutting edge of the bite.

7. A curved surface cutting method according to claim 1, wherein the material is a lens material, and the curve surface is one of a convex curved surface and a concave curved surface of a lens.

8. A curved surface cutting method according to claim 7, wherein the curved surface has concentric stepped sections, herein the concentric stepped sections are formed in the surface by cutting the surface of the material by the corner sections of the cutting edge of the bite.

9. A curved surface cutting method according to claim 8, wherein each of the corner sections of the cutting edge of the bite is angled at about 90 degree to about 120 degree with respect to the flat section of the cutting edge of the bite.

10. A curved surface cutting method according to claim 1, wherein the material is a lens forming metal mold material, and the curved surface is a metal mold forming surface of the lens forming metal mold material for forming one of a convex curved surface and a concave curved surface of a lens.

11. A curved surface cutting method according to claim 10, wherein the metal mold forming surface includes concentric stepped section forming sections for forming concentric stepped sections in one piece in the curved surface of the lens, and the concentric stepped section forming sections are formed by cutting the surface of the lens forming metal mold material by the corner sections of the cutting edge of the bite.

12. A curved surface cutting method according to claim 11, wherein each of the corner sections of the cutting edge of the bite is angled at about 90 degree to about 120 degree with respect to the flat section of the cutting edge of the bite.

13. A curved surface cutting method according to claim 1, wherein the width of the cutting edge of the bite is about 10 µm or greater.

14. A curved surface cutting method according to claim 1, wherein the width of the cutting edge of the bite is in a range between about 5 µm and about 10 µm.

* * * * *